United States Patent Office 3,304,346
Patented Feb. 14, 1967

3,304,346
FLUORESCENT TRIAZINYL BENZOPYRONE-ALDEHYDE CONDENSATION PRODUCTS
Gaetano F. D'Alelio, South Bend, Ind., assignor, by direct and mesne assignments, to Dal Mon Research Co., Cleveland, Ohio, a corporation of Delaware
No Drawing. Filed Mar. 1, 1963, Ser. No. 262,192
18 Claims. (Cl. 260—849)

This invention relates to the production of new synthetic materials and more particularly to new products of particular utility in the plastics and coating arts.

The compositions of this invention comprise new symmetrical triazine derivatives and condensation products of ingredients comprising an aldehyde, including polymeric aldehydes, hydroxyaldehydes, and aldehyde-addition products, e.g., formaldehyde, paraformaldehyde, aldol, glucose, dimethylol urea, trimethylol melamine, etc., with said triazine derivatives corresponding to the general formula:

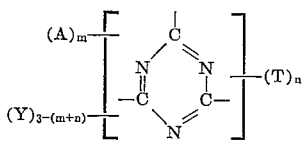

In the above formula $n$ and $m$ are integers of at least one and no more than two, and the sum of $m$ and $n$ does not exceed three; A represents an aldehyde-reactable group; Y represents any monovalent radical; T represents a benzopyrone group of the structure,

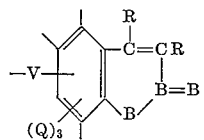

wherein V represents a member of the class consisting of —O—, —S—, and

Q represents a member of the class consisting of —R, —OR, —SR, —Cl, —Br, —F, and —NO$_2$; B represents —O— or —S—; R represents a member of the class consisting of H and hydrocarbon radicals containing one to twelve carbon atoms, such as alkyl, cycloalkyl and aryl radicals. Illustrative examples of R are —CH$_3$, —C$_2$H$_5$, —C$_3$H$_7$, —C$_4$H$_9$, —C$_5$H$_{11}$, —C$_6$H$_{13}$, —C$_{12}$H$_{25}$, —C$_6$H$_5$,

—C$_6$H$_4$CH$_3$, —C$_6$H$_3$(CH$_3$)$_2$, —C$_6$H$_4$C$_2$H$_5$,

—C$_6$H$_4$CH(CH$_3$)$_2$, —C$_{10}$H$_7$, —C$_6$H$_4$C$_6$H$_5$, —C$_6$H$_4$C$_5$H$_{11}$,

—CH$_2$C$_6$H$_5$, —C$_2$H$_4$C$_6$H$_5$, —C$_6$H$_{11}$, —C$_5$H$_9$,

—CH$_2$C$_6$H$_{11}$, —C$_6$H$_{10}$CH$_3$, etc.

In the above formula, it may be seen that when $n$ is one, $m$ can be one with one Y group, or $m$ can be two with no Y group, or if $n$ is two then $m$ is one and there will be no Y group. The only requirement for the triazine derivative of this invention is that it have at least one aldehyde-reactable group A and at least one T group.

The aldehyde-reactable A group is a grouping of atoms or radicals that react with aldehyde or polymeric-aldehydes to form a derivative such as illustrated by the following.

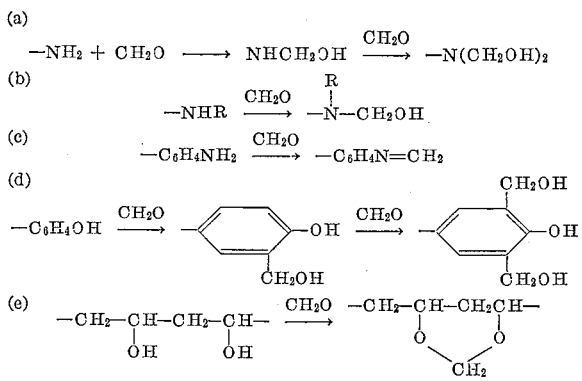

As illustrative examples of the aldehyde-reactable group, A, there are mentioned the following groups:

$$-S-(CR_2)_x-\overset{Y}{\underset{\|}{C}}-NHR$$

as disclosed in my U.S. Patent 2,295,562, issued September 15, 1942, wherein $x$ is an integer of at least 1 and not more than 2, Y represents a member of the class consisting of oxygen and sulfur, and R represents a member of the class consisting of hydrogen and monovalent hydrocarbon and halohydrocarbon radicals;

$$-NR-NR\overset{Y}{\underset{\|}{C}}-NHR$$

as disclosed in my U.S. Patent, 2,295,565, issued September 15, 1942, wherein Y represents a member of the class consisting of hydrogen and monovalent hydrocarbon and halohydrocarbon radicals;

$$\begin{array}{c}H\\-N\underset{HN}{\phantom{-}}\overset{\phantom{-}}{\phantom{-}}\overset{\phantom{-}}{C}-NHR\\ \phantom{-}\diagdown N\diagup\phantom{-}\\ \phantom{-}C\phantom{-}\\ \phantom{-}|\phantom{-}\\ NHR\end{array}$$

as disclosed in my U.S. Patent 2,295,562, issued September 15, 1942, wherein R represents a member of the class consisting of hydrogen and monovalent hydrocarbon and halohydrocarbon radicals;

$$-NR\overset{Y}{\underset{\|}{C}}-NHR$$

as disclosed in my U.S. Patent 2,312,688, issued March 2, 1943, wherein Y represents a member of the class consisting of oxygen and sulfur, and R represents a member of the class consisting of hydrogen and hydrocarbon radicals and halohydrocarbon radicals;

$$-SO_nR_{2n}\overset{Z}{\underset{\|}{C}}-NR-Y-SO_2NHR$$

as disclosed in my U.S. Patent 2,312,690, issued March 2, 1943, wherein $n$ represents an integer and is at least one and not more than 2, Z represents a member of the class consisting of oxygen and sulfur, Y represents a bivalent carbocyclic radical, and R represents a member of the class consisting of hydrogen and monovalent hydrocarbon radicals and substituted hydrocarbon radicals;

—NR—Z—SO$_2$NHR, as disclosed in my U.S. Patent 2,312,697, issued March 2, 1943, wherein Z represents an aryl nucleus and R represents a member of the class consisting of hydrogen and monovalent hydrocarbon radicals and substituted hydrocarbon radicals;

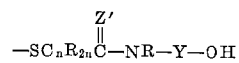

as disclosed in my U.S. Patent 2,312,700, issued March 2, 1943, wherein n represents an integer and is at least one and not more than 2, Z' represents a member of the class consisting of oxygen and sulfur, Y represents a divalent carbocyclic radical and R represents a member of the class consisting of hydrogen and monovalent hydrocarbon radicals and substituted hydrocarbon radicals;

—NHR, as disclosed in my U.S. Patent 2,335,846, issued December 7, 1943, wherein R represents a member of the class consisting of hydrogen and monovalent hydrocarbon radicals and halohydrocarbon radicals;

—Z—CONHR, wherein Z represents a divalent hydrocarbon radical and R represents hydrogen and a monvalent hydrocarbon radical and substituted hydrocarbon radicals;

—B—Z—CONHR, wherein B represents a member of the class consisting of oxygen, sulfur and —NR, Z represents a divalent hydrocarbon radical and substituted hydrocarbon radicals, and R represents a member of the class of hydrogen and monovalent hydrocarbon radicals and substituted hydrocarbon radicals;

HNR—NR—, wherein R represents a member of the class consisting of hydrogen and monovalent hydrocarbon radicals and substituted hydrocarbon radicals;

HO—Z—, wherein Z represents a divalent aromatic radical and substituted hydrocarbon radicals as hereinabove defined. A few typical compounds are

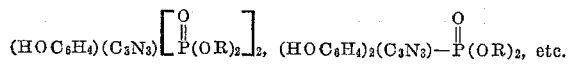

HO—Z—NR—, wherein R represents hydrogen and monovalent hydrocarbon radicals and substituted hydrocarbon radicals, and Z represents a divalent aromatic radical and substituted hydrocarbon radicals as hereinabove described. A few typical compounds are

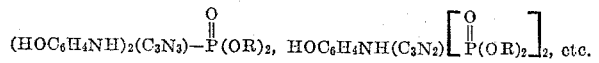

RCONHNR—, wherein R represents hydrogen and a monovalent hydrocarbon radical and substituted hydrocarbon radicals as previously defined hereinabove;

R$_2$NCY—NR—CHR'—, as disclosed in my U.S. Patent 2,339,623, issued January 18, 1944, wherein Y represents oxygen or sulfur, at least one R represents hydrogen and the other R's represent hydrogen, a monovalent hydrocarbon radical or a monovalent halogenated hydrocarbon radical, and R' represents hydrogen or a monovalent aliphatic, carbocyclic or aromatic hydrocarbon radical of not more than 6 carbon atoms, etc. Thus it may be seen that A may be any aldehyde-reactable group.

In the above triazine derivative formula, Y can be R which represents hydrogen or a monovalent hydrocarbon radical, whether saturated or unsaturated, substituted or unsubstituted, aliphatic, carbocyclic, aryl or heterocyclic, mono- or poly-nuclear, etc.; Y preferably contains no more than 20 carbon atoms. Examples of suitable hydrocarbon groups represented by R are aliphatic, cycloaliphatic, aromatic, e.g., methyl, ethyl, propyl, isopropyl, butyl, secondary butyl, butenyl, amyl, hexyl, allyl, methallyl, cyclopentenyl, cyclohexyl, cyclohexenyl, phenyl, diphenyl, naphthyl, tolyl, xylyl, ethylphenyl, propylphenyl, isopropylphenyl, allylphenyl, benzyl, phenylallyl, phenylpropyl, etc. and their homologues, as well as those groups with one or more of their hydrogen atoms substituted by halogens, as, for example, fluorine, chlorine, nitro groups, nitroso groups, amino groups, carboxyl groups, carbalkoxy groups, alkoxy, cycloalkoxy and aryloxy groups, mercapto groups, etc.; Y can also be hydroxyl and the alkoxy, cycloalkoxy and aryloxy radicals of aliphatic, cycloaliphatic, aromatic and heterocyclic hydroxy compounds, such as methyl alcohol, ethyl alcohol, butyl alcohol, isobutyl alcohol, dodecyl alcohol, phenol, the o-, m-, and p-cresols, the xylenols, the naphthols, ethylene glycol, methyl glycol ether, butyl glycol ether, glycerine, pentaerythritol, naphthol, hydroxy pyridine, including the alkoxy and aryloxy radicals of hydroxy acids and esters such as lactic acid, ethyl lactate, allyl lactate, methyl salicylate, and the chloro derivatives such as chlorophenol, chloronaphthol, ethylene chlorohydrin, and the acetoxy derivatives such as acetoxyethyl alcohol, etc., and these radicals are represented by RO—; Y can also be R—S— groups which are the mercapto equivalents to RO—; Y can also be —NH$_2$, that is, an amino group, a mono-substituted amino group or a disubstituted amino group as for example, the radicals of methylamine, ethylamine, butylamine, nonylamine, benzyl amine, dimethyl amine, aniline, naphthylamine, ethanol amine, diethanolamine, diisopropylamine, methylaniline, piperidine, aminopyridine, and the hydrazine radicals, namely, R$_2$NNR— from hydrazine, unsymmetrical dimethyl hydrazine, symmetrical dimethyl hydrazine, trimethyl hydrazine, phenyl hydrazine; Y can also be the N-radicals of the amino-esters, the amino-amides, and the amino-nitriles, specific examples of which are

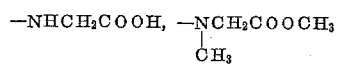

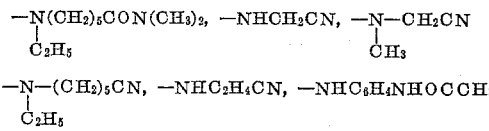

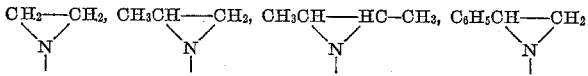

Y can also be radicals of alkylene imines such as for example

and the radicals of malonic esters and substituted malonic esters, nitriles and amides, such as, for example, -CH(COOCH$_3$)$_2$, -CH(COOCH$_2$CH=CH$_2$)$_2$
-CH(CN)$_2$, -CH[CON(CH$_3$)$_2$]$_2$

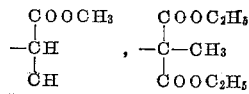

or Y can be the radical of another triazinyl ring, e.g., (CH$_3$NH)$_2$(C$_3$N$_3$)—, (HO)$_2$(C$_3$N$_3$)—, of the triazine ring can be attached through a bridge, such as

[(CH$_3$)$_2$N]$_2$(C$_3$N$_3$)—NHCH$_2$CH$_2$NH—
(C$_2$H$_5$NH)$_2$(C$_3$N$_3$)—OCH$_2$CH$_2$O—

(H$_2$N)$_2$(C$_3$N$_3$)—NHCH$_2$CH$_2$O—, etc.; Y can also be chlorine, bromine, —CH, COOR, etc.; as well as A and T. The Y group can also be an aldehyde containing a fluorescent structure other than T such as a group containing a stilbene moiety, e.g., C$_6$H$_5$CH=CHC$_6$H$_4$—, C$_6$H$_5$CH=CHC$_6$H$_4$O—, C$_6$H$_5$CH=CHC$_6$H$_4$S—
C$_6$H$_5$CH=CHC$_6$H$_4$N(CH$_3$)—
CH$_3$OC$_6$H$_4$CH=CHC$_6$H$_4$O—
C$_2$H$_5$OC$_6$H$_4$CH=CHC$_6$H$_4$N(C$_2$H$_5$)—, etc.

Alternately, the triazines used in the practice of this invention can be described by the formula

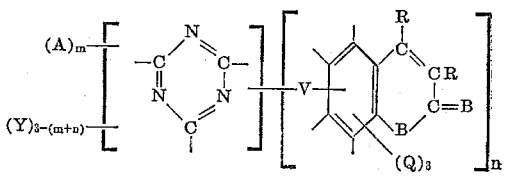

wherein A, Y, V, B, R, Q, m and n are as previously defined.

Thus, it may be seen that a wide variety of modified triazines can be used in the practice of this invention.

In practicing this invention the initial condensation reaction can be carried out at normal or elevated temperatures, at atmospheric, sub-atmospheric or super-atmospheric pressures, and under neutral, alkaline or acid conditions. Preferably, in most cases, the reaction between the components is initiated under alkaline conditions.

Any substance yielding an alkaline or an acid aqueous solution can be used in obtaining alkaline or acid conditions for the initial condensation reaction. For example, an alkaline substance such as sodium or potassium carbonate, mono-, di-, or tri-amines, etc., can be used. In some cases, it is desirable to cause the initial condensation reaction between the components to take place in the presence of a primary condensation catalyst and a secondary condensation catalyst. The primary catalyst can be either an aldehyde-nonreactable nitrogen-containing basic tertiary compound, e.g., tertiary amines such as trialkyl (e.g. trimethyl, triethyl, etc.) amines, or an aldehyde-reactable nitrogen-containing basic compound, for instance, ammonia, primary amines (e.g., ethyl amine, propyl amine, etc.) and secondary amines (e.g., dipropylamine, dibutylamine, etc.). The secondary condensation catalyst, which ordinarily is used in an amount less than the amount of the primary catalyst, advantageously is a fixed alkali, for instance, a carbonate, cyanide, or hydroxide, or an alkali metal (e.g., sodium, potassium, lithium, etc.).

Illustrative examples of acid condensation catalysts that can be employed are inorganic or organic acids, such as hydrochloric, sulfuric, phosphoric, acetic, lactic, acrylic, malonic, etc., or acid salts, such as sodium acid sulfate, monosodium phosphate, monosodium phthalate, etc. Mixtures of acids, of acid salts, or acids and acid salts can be employed, if desired.

The reaction between the aldehyde, e.g., formaldehyde, and the triazine derivative can be carried out in the presence of solvents, diluents, fillers, or other natural or synthetic resinous bodies, or while admixed with other materials that can also react with the aldehydic compound or with the triazine derivatives, e.g., ketones, urea, thiourea, selenourea, iminourea (guanidine), substituted ureas, thioureas, selenoureas, and iminoureas, numerous examples of which are given in my U.S. Patent 2,322,566, issued June 22, 1943; monoamides of monocarboxylic acids and polycarboxylic acids and polyamides of polycarboxylic acid, e.g., acetamide, halogenated acetamides (e.g. chloroacetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazine compounds, such as are disclosed in my U.S. Patent 2,382,211, issued August 14, 1945; aminotriazines, e.g., melamine, ammeline, ammelide, melem, melam, melon, etc.; phenol and substituted phenols, e.g., the cresols, the xylenols, the tertiary alkylphenols and other phenols, such as mentioned in my U.S. Patent 2,339,441; monohydric and polyhydric alcohols, e.g., butyl propylene glycol, pentaerythritol, polyvinyl alcohol, etc.; amines, including aromatic amines, e.g., aniline, etc. and the like. In such cases, the triazine derivatives should represent 5–95% by weight of the aldehyde reactive portion of such mixture.

The modifying reactants can be incorporated with the triazine derivative and the aldehyde to form an intercondensation product by mixing all the reactants and effecting condensation therebetween or by various permutations of reactants. For instance, a partial condensation product can be formed of ingredients comprising (1) urea or melamine or urea and melamine, (2) a triazine derivative of this invention, (3) an aldehyde, including polymeric aldehydes, hydroxy aldehydes and aldehyde-addition products, for instance, formaldehyde, paraformaldehyde, dimethylol urea, a polymethylol melamine; and thereafter reaction effected between this partial condensation product, and, for example, a curing reactant, specifically a chlorinated acetamide or an amino acid.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins, as well as for the preparation of organic pigments. The thermosetting, or potentially thermosetting resinous condensation products, alone or mixed with fillers, pigments, dyes, lubricants, plasticizers, curing agents, etc., can be used, for example, in the production of molding and laminating compositions. In other cases, they can be used as ion exchange resins and as tanning agents.

The liquid intermediate condensation products of this invention can be concentrated by the removal of, or diluted further by the addition of volatile solvents, to form liquid coating compositions of adjusted viscosity and concentration. The heat-convertible or potentially heat-convertible resinous condensation products can be used in the liquid state, for instance, as impregnants for wood, leather, paper and other porous bodies, as surface-coating materials in the production of paints, varnishes, lacquers, enamels, etc., for general adhesive applications in producing laminated articles, and for other purposes. The liquid, heat-hardenable condensation products also can be used directly as casting resins, while those which are of gel-like nature in the partially condensed state can be granulated and dried to form clear, unfilled heat-convertible resinous products.

In producing these new condensation products the choice of the aldehyde is dependent largely on economic considerations and upon the particular properties desired in the finished product. Preferred aldehydic reactants are formaldehyde and compounds engendering formaldehyde, e.g., paraformaldehyde, hexamethylene tetramine, etc. Illustrative examples of other aldehydes that can be employed are acetaldehyde, propionaldehyde, butyraldehyde, heptaldehyde, octaldehyde, acrolein, methacrolein, crotonaldehyde, benzaldehyde, furfural, hydroxyaldehydes (e.g., aldol, glucose, glycolic aldehyde, glyceraldehyde, etc.), mixtures thereof or mixtures of formaldehyde (or compounds engendering formaldehyde) with such aldehydes.

Illustrative examples of aldehyde-addition products that can be used instead of the aldehydes themselves are the mono- and poly-(N-carbinol) derivatives, particularly the mono- and polymethylol derivatives of urea, thiourea, selenourea, and iminoureas, and substituted ureas, thioureas, selenoureas, and iminoureas, mono- and poly-(N-carbinol) derivatives of amides or polycarboxylic acids, e.g., maleic, itaconic, fumaric, adipic, malonic, succinic, citric, phthalic, etc., mono- and poly-(N-carbinol) derivatives of the aminotriazoles mono- and poly-(N-carbinol) derivatives of the aminotriazines. Particularly good results are obtained with active methylene-containing bodies as a methylol urea, more particularly mono- and dimethylol ureas, a methylol aminotriazine, more particularly a methylol melamine, e.g., monomethylol melamine and, polymethylol melamines, i.e., the di-, tri-, tetra-, penta-, and hexa-methylol melamines. Mixtures of aldehydes and aldehyde-addition products can be employed, e.g., mixtures of formaldehyde and methylol compounds, such, for instance, as dimethylol urea, trimethylol melamine, hexamethylol melamine, etc.

The ratio of the aldehydic reactant to the triazine derivative can be varied over a wide range depending upon the particular properties desired in the finished product. Ordinarily these reactants are employed in an amount corresponding to at least one mole of the aldehyde, especially formaldehyde, for each mole of the triazine derivative. Thus, for example, one to seven or eight or more moles of an aldehyde can be used for each mole of triazine derivative. When an aldehyde is available for reaction in the form of an alkylol derivative, more particularly a methylol derivative such, for instance, as dimethylol urea, trimethylol melamine, etc., then higher amounts of such aldehyde-addition products are used, for instance, from 2 to 3 up to 15 to 20 or more moles of such alkylol derivatives for each mole of the triazine derivative.

As indicated hereinbefore, the properties of the fundamental resin can be varied widely by introducing other modifying bodies before, during, or after effecting condensation between the primary components. Thus, modifying agents that can be used include, for example, methyl, ethyl, propyl, isopropyl, isobutyl, hexyl, etc. alcohols; polyhydric alcohols, such, for example, as diethylene glycol, triethylene glycol, pentaerythritol, etc.; alcohol ethers, e.g., ethylene glycol monomethyl ether, ethylene glycol monoethyl ether, diethylene glycol monobutyl ether, etc.; amides, such as formamide, stearamide, acrylamide, benzene sulfonamides, toluene sulfonamide, the aryl disulfonamides, adipic diamide, phthalamide, etc.; amines, e.g., ethylene diamine, phenylene diamine, etc.; ketones, including halogenated ketones, etc.; nitriles, including halogenated nitriles, e.g., acrylonitrile, methacrylonitrile, succinonitrile, fumaryl nitrile, chloroacetonitriles, etc.; acrylated ureas, more particularly halogenated acrylated ureas of the kind described in my U.S. Patent 2,851,559, and others.

The modifying bodies also can take the form of high molecular weight bodies with or without resinous characteristics, for example, hydrolyzed wood products, formalized cellulose derivatives, lignin, protein-aldehyde condensation products, aminotriazine, aldehyde condensation products, aminotriazole-aldehyde condensation products, polyacrylamide, styrene-maleic imide copolymers, etc. Other examples of modifying bodies are the urea-aldehyde condensation products, the aniline-aldehyde condensation products, furfural condensation products, phenol-aldehyde condensation products, modified or unmodified, saturated or unsaturated polyhydric-alcohol-polycarboxylic acid condensation products, water-soluble cellulose derivatives, natural gums and resins, such as shellac, rosin, etc.; polyvinyl compounds, such as polyvinyl esters, e.g., polyvinyl acetate, polyvinyl butyrate, etc., polyvinyl ethers including polyvinyl acetals, especially polyvinyl formal, etc.

Dyes, pigments, plasticizers, mold lubricants, opacifiers and various reinforcing fillers (e.g. wood flour, glass fibers, including defibrated asbestos, mineral wool, mica, cloth cuttings, glass cloth, glass mat, etc.) can be compounded with the resin in accordance with conventional practice to provide various thermoplastic and thermosetting molding compositions.

The modified and unmodified resinous compositions of this invention have a wide variety of uses. For example, in addition to their use in the production of molding compositions, they can be used as modifiers of other natural and synthetic polymers, as laminating varnishes in the production of laminated articles wherein sheet materials, e.g., paper, cloth, sheet asbestos, glass mats and glass fibers, etc., are coated and impregnated with the resin, superimposed and thereafter united under heat or heat and pressure. They can be used in the production of wire coatings or baking enamels from which insulated wires and other coated products are made; for bonding or cementing together mica flakes to form a laminated mica article, for bonding together, abrasive grains in the production of resin-bonded abrasive articles such, for instance, as grindstones, sand-papers, emery cloths, etc., in the manufacture of electrical resistors, etc. They can also be employed for treating cotton, linen, and other cellulosic materials in sheet or other form. They can also be used as impregnants or electrical coils and for other electrically insulating applications. Because of the nitrogen content of these resins, they can be used as fire-retardant impregnants and coatings alone, or in combination with other materials, such as with cellulosic substances.

The modified and unmodified condensation products of this invention have a wide variety of particular uses due to their ability to absorb U.V. light and/or to the internal fluorescence of the polymers. The clear, colorless condensation products are transparent and clear, and images can be read through films of the polymer, yet in ordinary daylight, sunlight, and ultraviolet lamplight they absorb a portion of the ultraviolet portion of the spectrum and most of them reemit the energy into the visible spectrum such as blue, yellow, etc., depending on the nature of the T-groups and the substituents in the T-groups, the presence or absence of fluorescing Y groups, and the nature and number of

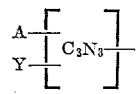

groups. In this manner, they function also as ultraviolet screening agents to prevent deterioration of any substance dissolved in the polymer or coated by the polymer, and perform a dual function as brightness for the substrate, with the added advantage that they can be used in the conventional manner as molding compounds, laminating varnishes, impregnants alone or with other polymer and fillers such as paper, cotton, wood, wool, leather, proteins and the like. Also they can be used to increase the wet strength of paper and wood pulps, while at the same time increasing the brightness and protecting the cellulose from ultraviolet degradation.

The condensation products of this invention are particularly useful in the production of light responsive fluorescent materials such as daylight fluorescent pigments and coatings for use in silk-screen printing, letter-press inks, paints, lacquers, and the like. Heretofore, fluorescent dyestuff, dissolver or dispersed in a variety of resinous materials have been used for this purpose. Normally, fluorescent dyes of this type are deteriorated by sunlight rapidly in outdoor exposures, and the resinous materials in which they are dissolved is believed to provide a protective coating or barrier for the dyestuff to minimize its destruction or deterioration upon exposure to a normal atmospheric environment. Of a large number of commercially available resinous materials only a very limited number have been found to be usable in the formulation of pigments or vehicles containing the fluorescent dyestuff. Some of the satisfactory condensation aminoplast resins include the urea-formaldehyde-, the melamine-formaldehyde-, the arylsulfonamide-formaldehyde-, the melamine-arylsulfonamide-formaldehyde, and the urea-melamine-resin in both thermoplastic and thermosetting modifications.

While some of these resins are improvements over the prior resins used in the art, none of them is, per se, an inherently fluorescent resin or brightening agent which can offer maximum protection to the added fluorescent dye. Thus, it is a further object of this invention to produce and provide a method of producing daylight fluorescent pigments, inks, coating compositions and the like with improved thermal stability and light fastness. This is achieved by incorporating fluorescent dyes into the fluorescent resins derived from the condensation of aldehydes with the monomers of this invention in the absence or presence of other modifiers as described hereinabove. Due to the fluorescent nature of the resin, the daylight fluorescent dyestuffs appear to be brighter and more intense than similar compositions not containing the resins of this invention. Examples of suitable daylight-fluorescent dyestuff and their colors include, but are not limited, to the following:

| Dye: | Color |
|---|---|
| 2,4 disulfobenzoic acid | Red |
| 2,5 disulfobenzoic acid | Red |
| Meta diethylaminophenolphthalein hydrochloride | Red |
| Meta diethylaminophenolsuccein hydrochloride | Red |
| Ethyl ester of m-monoethylamine phenolphthalein hydrochloride | Orange |
| Ethyl ester of m-butylamine phenolphthalein hydrochloride | Orange |
| 4-amino 1,8-naphthol-2',4'-dimethyl phenylimide | Yellow |
| Meta aminophenolphthalein hydrochloride | Yellow-green |
| Di para dimethylaminophenyl ketone imine hydrochloride | Yellow-green |
| 2,3,diphenyl N-phenyl quinoxalonium sulfate | Green |

The present invention is based on the discovery that new and valuable materials having particular utility in the polymer, plastics, impregnating and coating arts can be produced by effecting reaction between ingredients comprising an aldehyde, including polymeric aldehydes and aldehyde-addition products, and a new triazine derivative of the kind embraced by the above general formula. Among the triazine derivatives embraced by the formulas of the various classes of compounds used in producing the new condensation products of this invention are the triazines having the substituents indicated by the groups attached to the structure

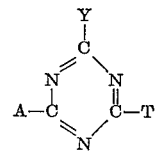

in the following table.

| Substituent A | Substituent Y | Substituent T |
|---|---|---|
| —NH₂ | —NH₂ | (benzo-fused dioxole with —CH=CH—C=O) |
| —NH₂ | —NH₂ | (benzo-fused dioxole with —CH=CH—C=O) |
| —NH₂ | —NH₂ | (benzo-fused dioxole with —CH=CH—C=S) |
| —NH₂ | —NH₂ | (benzo-fused dithiole with —CH=CH—C=O) |
| —NH₂ | —NH₂ | (benzo-fused dithiole with —CH=CH—C=S) |
| —NH₂ | —NH₂ | (benzo-fused dioxole with CH₃—C=CH—C=O) |
| —NH₂ | —NH₂ | (benzo-fused dioxole with —CH=C(CH₃)—C=O) |
| —NH₂ | —NH₂ | (benzo-fused dioxole with CH₃—C=C(CH₃)—C=O) |
| —NH₂ | —NH₂ | (CH₃O-substituted benzo-fused dioxole with —CH=CH—C=O) |

| Substituent A | Substituent Y | Substituent T |
|---|---|---|
| —NH₂ | —NH₂ | 7-(4-methylcoumarin-7-yl)amino group (—NH— linked to 4-methylcoumarin) |
| —NH₂ | —NH₂ | N-methyl-N-(4-methylcoumarin-7-yl)amino group |
| —NH₂ | —NH₂ | 6-nitro-4-methylcoumarin-7-yloxy group |
| —NH₂ | —NH₂ | 6-methyl-4-methylcoumarin-7-yloxy group |
| —NH₂ | —NH₂ | 6-chloro-4-methylcoumarin-7-yloxy group |
| —NH₂ | —NH₂ | 6-bromo-4-methylcoumarin-7-yloxy group |
| —NH₂ | —NH₂ | 4-dodecylcoumarin-7-yloxy group (C=C₁₂H₂₅) |
| —NH₂ | —NH₂ | N-phenyl-N-(4-methylcoumarin-7-yl)amino group |
| —NH₂ | —NH₂ | 4-phenylcoumarin-7-yloxy group |
| —NH₂ | —NH₂ | 5,6-dimethyl-4-methylcoumarin-7-yloxy group |
| —NH₂ | —P(OC₂H₅)₂ (with =O) | 4-methylcoumarin-7-yloxy group |
| —NHC₆H₅ | —NH₂ | 4-methylcoumarin-7-yloxy group |

| Substituent A | Substituent Y | Substituent T |
|---|---|---|
| —NHCH₃ | —NHCH₃ | 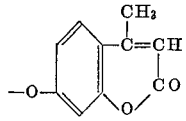 |
| —NH₂ | —Cl | 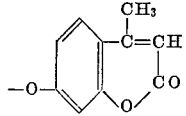 |
| —NH₂ | —OH | 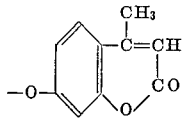 |
| —NH₂OCCH₂—S— | NH₂—OCCH₂—S— | 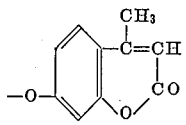 |
| NH₂CONHNH— | NH₂CONHNH— | 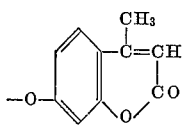 |
| HOC₆H₄S— | HOC₆H₄S— | 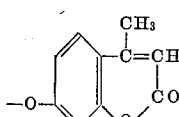 |
| HOC₆H₄NH— | HOC₆H₄NH— | 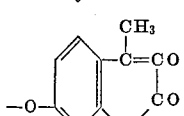 |
| 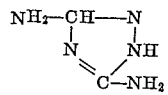 | —OC₆H₄CH₂—CH=CH₂ | 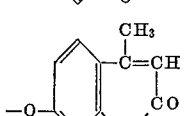 |
| 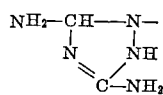 |  | 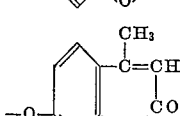 |
| NH₂CONH— | 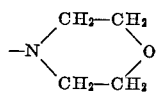 | 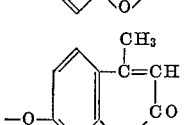 |
| H₂NSO₂C₆H₄NH— | —OCH₂CH₂OC₆H₅ | 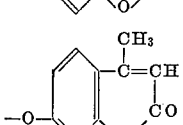 |
| H₂NSO₂C₆H₄NH— | —CH₂CH₂OH | 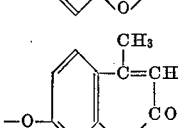 |
| H₂NO₂SC₆H₄O— | —CH₂CH₂CN | 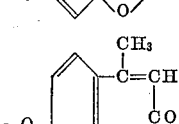 |

| Substituent A | Substituent Y | Substituent T |
|---|---|---|
| $H_2NO_2SC_6H_4-$ | $-CH_2COOCH_3$ | methylenedioxyphenyl-methylidene-lactone group |
| 2,5-dihydroxyphenyl-NH- | $-CH(COOC_2H_5)_2$ | same |
| $CH_3CONHNH-$ | $-S-C_6H_5$ | same |
| 2,4-diamino-1,3,5-triazin-6-yl-NHNH- | $-N(C_6H_{11})_2$ | same |
| 2,4-diamino-1,3,5-triazin-6-yl-NHNH- | $-N(CH_3)-C_6H_4NO_2$ | same |
| 2,4-diamino-1,3,5-triazin-6-yl-NHCH$_2$CH$_2$NH- | $-C_6H_5$ | same |
| 2,4-diamino-1,3,5-triazin-6-yl-NHCH$_2$CH$_2$NH- | $-N(CH_2CH=CH_2)_2$ | same |
| $-NH_2$ | $-OC_6H_4COOC_2H_5$ | same |
| $-NH_2$ | $-N(CH_3)-C_{10}H_7Cl$ | same |
| $-NH_2$ | $-OCH_2CH_2O-C$ (2,6-bis(dimethylamino)-1,3,5-triazin-4-yl) | same |
| $-NH_2$ | $-OCH_2CH_2O-C$ (2,6-bis(dimethylamino)-1,3,5-triazin-4-yl) | same |

| Substituent A | Substituent Y | Substituent T |
|---|---|---|
| $H_2HO_2SC_6H_4NH-$ | $H_2NO_2SC_6H_4NH-$ | ![T structure] |
| $CH_3NHO_2SC_6H_4NH-$ | $CH_3NHO_2SC_6H_4NH-$ | ![T structure] |
| $H_2NOC(CH_2)_5NH-$ | $H_2NOC(CH_2)_5NH-$ | ![T structure] |
| $NH_2CONHNHOCCH_2-$ | $NH_2CONHNHOCCH_2-$ | ![T structure] |
| $NH_2OCCH_2O-$ | $H_2NO_2SC_6H_4NH-$ | ![T structure with CH_2] |
| $\begin{matrix}NH_2OC\\ \quad\quad CH-\\ NH_2OC\end{matrix}$ | $\begin{matrix}H_2NOC\\ \quad\quad CH-\\ H_2NOC\end{matrix}$ | ![T structure] |
| $(NH_2O_2S)_2C_6H_3NH-$ | $(H_2NO_2S)_2C_6H_3NH-$ | ![T structure] |
| $H_2NO_2SC_6H_4NH-$ | $\begin{matrix}\quad O\\ \quad \|\|\\ -P-OC_2H_5\\ \quad \|\\ \quad OC_2H_5\end{matrix}$ | ![T structure] |
| $H_2NO_2SC_6H_4NH-$ | $\begin{matrix}\quad O\\ \quad \|\|\\ -P-OC_2H_5\\ \quad \|\\ \quad NHC_6H_5\end{matrix}$ | ![T structure] |
| $H_2NO_2SC_6H_4NH-$ | $\begin{matrix}\quad O\\ \quad \|\|\\ -P-(OC_2H_5)_2\end{matrix}$ | ![T structure] |

The triazine derivatives used in practicing the present invention are prepared conveniently by condensing the corresponding chloro-triazines with an HT compound, etc.

(1)     $(A)_2(C_3N_3)X + HT \rightarrow HX + A_2(C_3N_3)$ or (2) 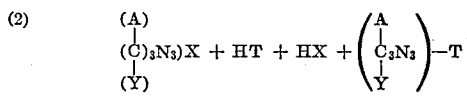

or (3)     $A(C_3N_3)X + 2HT \rightarrow 2HX + (A)-(C_3N_3)(T)_2$ wherein X, Y and T are as previously defined, X is a halogen, e.g., Cl, Br, I, and $C_3N_3$ represents the 1,3,5 triazine ring.

Some specific examples of the above are (1) 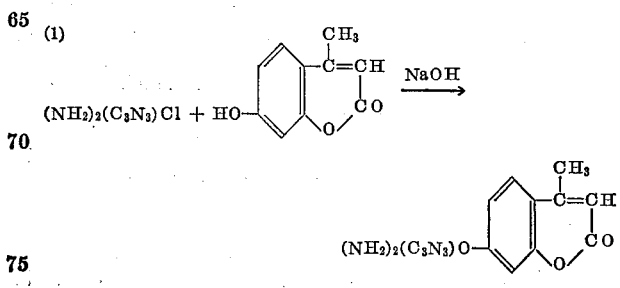

(2)

$$NH_2(C_3N_3)Cl_2 + 2HO\text{-benzopyrone} \xrightarrow{NaOH}$$

$$NH_2(C_3N_3)\text{-}[O\text{-benzopyrone}]_2$$

(3)

$$CH_3NH(C_3N_3)Cl + H_2N\text{-}C_6H_4\text{-}OC_6H_4CONH_2 \xrightarrow{KOH}$$

$$CH_3NH(C_3N_3)\text{-}NH\text{-benzopyrone-}OC_6H_4CONH_2$$

(4)

$$(NH_2)_2(C_3N_3)NHCH_2CH_2NH(C_3N_3)Cl_2 + 2HS\text{-thiobenzopyrone} \xrightarrow{NaOH}$$

$$(NH_2)_2(C_3N_3)NHCH_2CH_2NH(C_3N_3)\text{-}[S\text{-thiobenzopyrone}]_2$$

Alternately, these compounds can be prepared by using a halotriazinyl benzopyrone compound with a compound containing a reactive hydrogen represented by MH, wherein M represents Y or A groups as defined above, as for example (1)
$$T(C_3N_3)X_2 + 2MH \xrightarrow[\text{acceptor}]{\text{hydrohalide}} T(C_3N_3)M_2$$

or (2)
$$T_2(C_3N_3)X + MH \xrightarrow[\text{acceptor}]{\text{hydrohalide}} T_2(C_3N_3)M$$

or as an illustration:

(1)

$$Cl_2(C_3N_3)\text{-}O\text{-benzopyrone} + 2C_6H_5NH_2 \xrightarrow{KOH}$$

$$(C_6H_5NH)_2(C_3N_3)\text{-}[O\text{-benzopyrone}]$$

(2)

$$Cl(C_3N_3)\text{-}[O\text{-benzopyrone}]_2 + NH_3 \xrightarrow{NH_3(excess)}$$

$$(NH_2)(C_3N_3)\text{-}[O\text{-benzopyrone}]_2$$

Illustrative of the MH compounds are the alcohols such as $C_2H_5OH$, $(CH_3)_2CHOH$, $C_4H_9OH$, $C_{12}H_{25}OH$, etc.; the cycloaliphatic alcohols such as cyclohexanol, cyclopentanol, etc., ammonia and the amines, e.g., $CH_3NH_2$, $C_2H_5NH_2$, $(CH_3)_2NH$, $CH_2=CHCH_2NH_2$, $C_6H_5NH_2$, $CH_3C_6H_4NH_2$, $ClC_6H_4NHCH_3$, $NH_2C_6H_4COOCH$, $NH_2C_6H_4SO_2NH_2$ etc., as well as other reactive hydrogen-containing compounds having the A and Y groups indicated above. By these and related procedures given in J. Am. Chem. Soc., 73, 2986–3004 (1951) are the intermediates use in the preparation of the condensation products of this invention prepared.

The T group in the triazine intermediates is a benzophenone derivative $$\text{benzopyrone structure}$$

attached to the $(C_3N_3)$ group by means of oxygen, sulfur or an amino-nitrogen and has the formula $$\text{substituted benzopyrone with V, Q, R, B}$$

wherein V, Q, R and B are as previously described. Some of the compounds such as umbelliferone and β-methyl umbelliferone are commercially available and the others can be prepared by methods similar to those used for the umbelliferones or by other synthesis. For example, umbelliferone is prepared from the dihydroxy cinnamic acid. Thus $$HO\text{-}C_6H_3(OH)\text{-}CH=CHCOOH \xrightarrow{\Delta} HO\text{-benzopyrone}$$

When the thio-compound is used, then the corresponding sulfur derivative is obtained, $$HS\text{-}C_6H_3(SH)\text{-}CH=CHCOOH \xrightarrow{\Delta} HS\text{-thiobenzopyrone}$$

When the α-substituted cinnamic acids are used than the corresponding substituted derivative is obtained, thus $$HO\text{-}C_6H_3(OH)\text{-}CH\text{-}CR\text{-}COOH \xrightarrow{\Delta} HO\text{-R-substituted benzopyrone}$$

The acyl acetic esters, such as aceto acetic esters can be reacted with dihydroxy benzenes to produce the β-methyl derivatives, as $$HO\text{-}C_6H_4\text{-}OH + CH_3COCH_2COOC_2H_5 \xrightarrow{H_2SO_4}$$

$$HO\text{-}\beta\text{-methyl benzopyrone}$$

When the substituted acyl acetic esters are used, then the substituted derivatives are obtained as for example, $$HO\text{-}C_6H_4\text{-}OH + CH_3COCHRCOOCH_3 \xrightarrow{H_2SO_4}$$

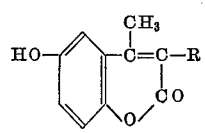

and

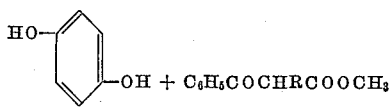 $\xrightarrow{H_2SO_4}$

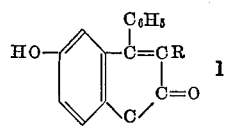

Further, when an amino hydroxy aryl compound is condensed with an acyl acetic ester, the corresponding amino benzopyrone is obtained, thus

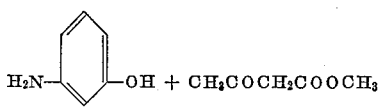 $\xrightarrow{H_2SO_4}$

and

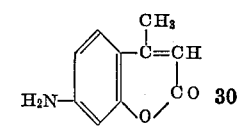 $\xrightarrow{H_2SO_4}$

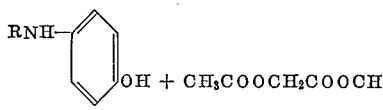

Alternately, the amino compounds can be prepared by reducing a nitro benzopyrone, e.g.,

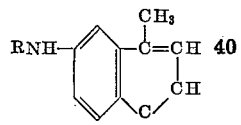 $\xrightarrow{H_2SO_4}$

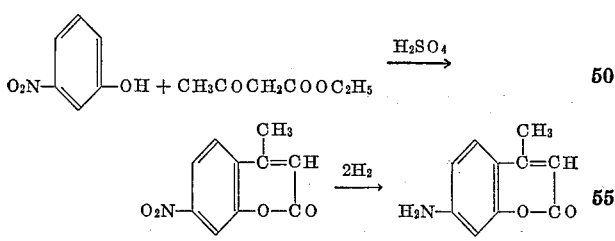

The reagent, $P_2S_5$ converts the —C=O readily into the —C=S group, thus

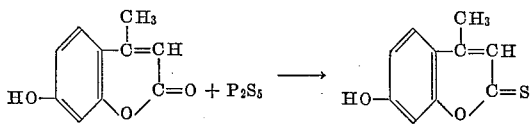

and

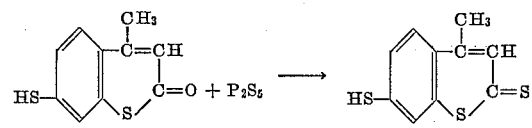

The benzene ring in the pyrone structure may have its three available remaining positions occupied by hydrogen or substituted as indicated above by Q groups, preferably attached to the benzene ring before the synthesis of the pyrone, thus

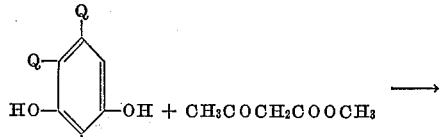

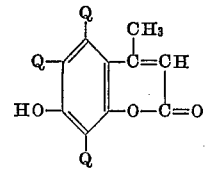

e.g.,

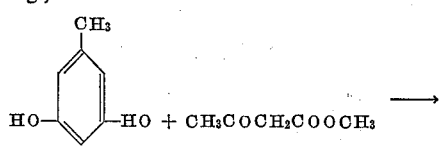

and

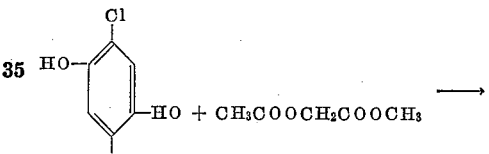

EXAMPLE I

*Preparation of aldehyde-reactable triazine derivatives*

(a) Finely ground 2,4-diamino-6-chloro-1,3,5-triazine (45.0 parts) is suspended in 1000 parts of hot water containing 5 parts of concentrated hydrochloric acid, 2 parts of octyl alcohol and 58 parts of

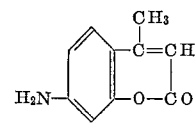

and the mixture refluxed for one-half hour. The solution is then decolorized with charcoal and filtered hot. The filtered solution is made strongly acid by the addition of 100 parts of concentrated hydrochloric acid. The resulting hydrochloride is removed by filtration and suspended in 1200 parts of hot water and NaOH added until the solution is neutral to Congo red indicator. The precipitated product is then removed by filtration, washed free of chlorides and dried at 100° C. The yield is 93–95% of the theoretical yield of the compound of the formula

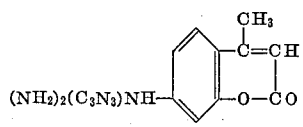

On analysis the product gives values of 54.52% carbon, 4.23% hydrogen, and 29.5% nitrogen, which are in close agreement with the theoretical values.

(b) 2,4-di(pyrone)-6-amino-1,3,5-triazine is prepared as follows. Fifty-five (55) parts of 2-amino-4,6-dichloro-1,3,5-triazine is suspended in 1000 parts of hot water containing 5 parts of commercial hydrochloric acid and 2 parts of octyl alcohol with 105 parts of

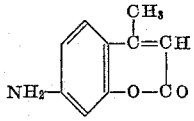

and the mixture refluxed for 2 hours. The solution is then decolorized with activated charcoal, filtered hot, and then made strongly acid by the addition of 100 parts of concentrated hydrochloric acid. After cooling, the salt is removed by filtration and suspended in 1000 parts of water, made neutral to Congo red indicator by adding NaOH, filtered and washed free of chlorides. There is obtained approximately an 80% yield of

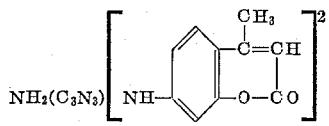

which on analysis gives the values: 62.49% carbon; 18.88% nitrogen; and 4.6% hydrogen. These are in close agreement with the theoretical values.

(c) A solution of 185 parts of cyanuric chloride in 750 parts of acetone is added to 2000 parts of water cooled to 5° C. containing 60 parts of $Na_2CO_3$ and 173 parts of

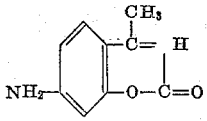

in a reaction vessel equipped with stirrer, cooling means, etc. Reaction is continued for 3 hours to produce the intermediate

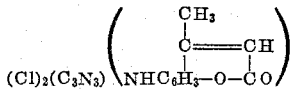

after which there is added 125 parts of 28% $NH_3$ solution, and the reaction temperature raised to 35–50° C. for 4 hours. A slurry of

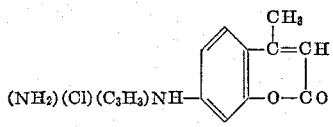

is obtained in an almost quantitative yield which can be recovered by filtration, washed with water and dried. This is condensed with aldehyde to produce resinous condensation products and can be used as an intermediate for other derivatives. When, instead of ammonia, an equivalent amount of amines, $RNH_2$ are used respectively in this procedure, such as $CH_3NH_2$, $C_6H_5NH_2$, etc., the corresponding amino derivatives are obtained.

(d) A slurry of 50 parts of

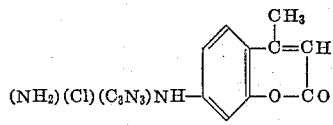

in 500 parts of water and 15 parts of $NH_3$ are heated in an autoclave at 110–120° C. for 2 hours, and the reaction product cooled to room temperature. Upon filtration there is obtained an almost quantitative yield of the triazine

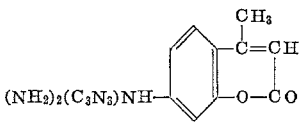

When an equivalent amount of $CH_3NH_2$, $(CH_3)_2NH$, $C_4H_9NH_2$, and $NH_2CH_2CH_2OH$ are used respectively instead of $NH_3$ in this procedure there are obtained respectively the compound:

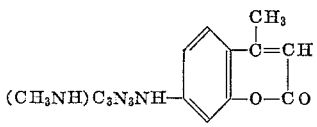

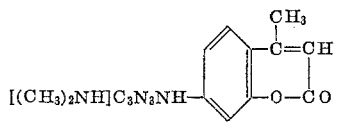

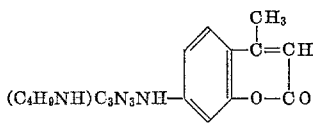

and

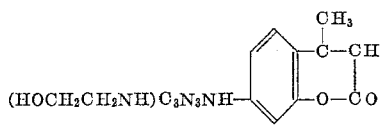

On analyses for C, H and N, these give values in close agreement with the theoretical values for these compounds.

(e) The procedure of Example I is repeated using respectively, instead of the amino pyrone, a hydroxy pyrone and a mercapto pyrone, and the corresponding derivatives are obtained:

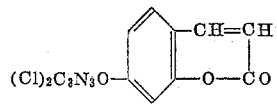

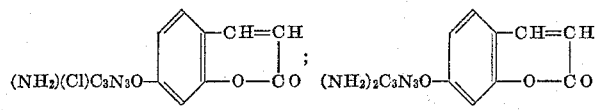

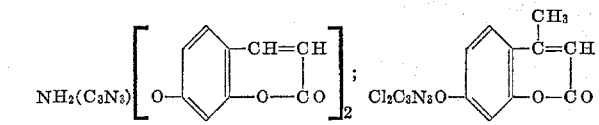

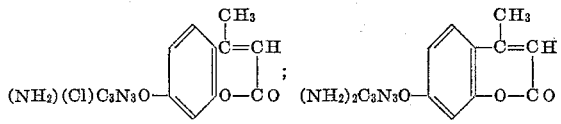

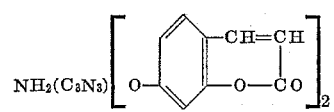

(f) A slurry of 31 parts of

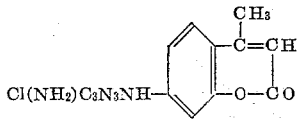

9.6 parts of $C_6H_5OH$ and 4.1 parts of NaOH in 200 parts of water are refluxed for 2–3 hours, and there is obtained the compound $$(C_6H_5O)(NH_2)C_3N_3NHC_6H_3\underset{O-CO}{\overset{CH_3}{\underset{|}{\overset{|}{C=CH}}}}$$

which is removed by filtration and dried.

When an equivalent amount of $$(NH_2)(Cl)C_2N_3\underset{O-CO}{\overset{CH_3}{\underset{|}{\overset{|}{C=CH}}}}$$

is used instead of the amino derivative, there is obtained $$(C_6H_5O)(NH_2)C_3N_3O-\underset{O-CO}{\overset{CH_3}{\underset{|}{\overset{|}{C=CH}}}}$$

When, instead of phenol there are used respectively equivalent amounts of $CH_3C_6H_4OH$, $C_6H_5SH$, $$HOCH_2COOCH_3, HOC_6H_4CH=CHC_6H_5$$

there are obtained respectively the compounds $$(CH_3C_6H_4O)NH_2C_3N_3O-\underset{O-CO}{\overset{CH_3}{\underset{|}{\overset{|}{C=CH}}}}$$

$$(C_6H_5S)NH_2C_3N_3O-\underset{O-CO}{\overset{CH_3}{\underset{|}{\overset{|}{C=CH}}}}$$

$$(H_3COOCH_2O)NH_2C_3N_3O-\underset{O-CO}{\overset{CH_3}{\underset{|}{\overset{|}{C=CH}}}}$$

$$(C_6H_5CH=CHC_6H_4O)NH_2C_3N_3O-\underset{O-CO}{\overset{CH_3}{\underset{|}{\overset{|}{C=CH}}}}$$

(g) A mixture of 31 parts of $$(Cl)(NH_2)C_3N_3O-\underset{O-CO}{\overset{CH_3}{\underset{|}{\overset{|}{C=CH}}}}$$

and 200 parts of ethyl phosphite are heated to 130° C. until no more ethyl chloride is liberated, following which the mixture is cooled to room temperature, the product washed with water and dried. There is obtained the product $$(NH_2)\left[\overset{O}{\underset{\|}{P}}-(OC_2H_5)\right]_2C_3N_3O-\underset{O-CO}{\overset{CH_3}{\underset{|}{\overset{|}{C=CH}}}}$$

which is a flame-retardant intermediate that can be reacted with aldehydes to produce flame-retardant compositions. It can also be hydrolyzed with alkalies to the phosphonium salt to give the compounds $$(NH_2)\left(\begin{array}{c}O\\\|\\P-OC_2H_5\\|\\ONa\end{array}\right)(C_3N_3)O-\underset{O-C=O}{\overset{CH_3}{\underset{|}{\overset{|}{C=CH}}}}$$

and $$(NH_2)\left[\overset{O}{\underset{\|}{P}}-(ONa)_2\right](C_3N_3)O-\underset{O-CO}{\overset{CH_3}{\underset{|}{\overset{|}{C=CH}}}}$$

(h) The procedure of Example I(d) is repeated using an equivalent amount of arsenilic acid and there is obtained the compound $$(NH_2)[NHC_6H_4\overset{O}{\underset{\|}{As}}(OH)_2](C_3N_3)N-\underset{O-CO}{\overset{\overset{H}{|}\overset{CH_3}{|}}{\underset{|}{\overset{|}{C=CH}}}}$$

By these procedures and related procedures disclosed hereinabove are prepared the aldehyde-reactable triazine derivatives used in preparing the condensation resin products of this invention.

EXAMPLE II

Twenty-one (21) parts of $$(NH_2)_2(C_3N_3)-NH-\underset{O-CO}{\overset{CH_3}{\underset{|}{\overset{|}{C=CH}}}}$$

and 32 parts of aqueous formaldehyde (37.2%) are heated together under reflux at the boiling point of the mixture for 30 minutes, yielding a condensation product that cures to an insoluble, infusible mass when a sample is heated on a hot plate at 150° C. A satisfactory compound that shows adequate flow characteristics during molding is produced by mixing a portion of the resinous syrup with a weight of alpha cellulose equal to the solid content of the syrup, followed by drying at low temperature to remove the excess water. A well-cured, molded piece is obtained by molding a sample of the dried ground molding compound for 3 minutes at 145° C. under a pressure of 5000 pounds per square inch. When 21 parts of $$(NH_2)_2C_3N_3O-\underset{O-CO}{\overset{CH_3}{\underset{|}{\overset{|}{C=CH}}}}$$

are used instead of the amino compound of this example, similar results are obtained.

Instead of heating the reactants under reflux, as described above, the mixture can be shaken or stirred for a longer period, for example, 24 to 72 hours or longer at room temperature or at —5° C., to effect reaction between the components and to obtain a soluble, fusible reaction product which can be heat-hardened. This condensation is performed preferably in the presence of an alkaline condensation catalyst, such as sodium hydroxide, sodium carbonate, ammonia, triethanolamine, hexamethylene tetraamine, etc., and cured in the presence of acidic curing catalysts, or catalysts which under the influence of the reaction or heat produce acidic substances, such as acetic acid, phthalic acid, ammonium phosphate, ammonium chloride, glycine, chloroacetamide, chloroacetyl urea, etc., although the reaction will proceed in the absence of added catalysts but at a lower rate.

EXAMPLE III

One hundred thirty (130) parts of $$(CH_3NH)_2(C_3N_3)O-\underset{O-CO}{\overset{CH_3}{\underset{|}{\overset{|}{C=CH}}}}$$

143 parts of aqueous $CH_2O$ (37.5% $CH_2O$), and NaOH in 5.5 parts of $H_2O$ are refluxed for 30 to 45 minutes to produce a resin dispersion which, when neutralized with acetic acid and dehydrated, produces a clear thermoplastic resin. This resin is acidified with 1 part of phthalic anhydride and heated further to give a hard resin. This resin is also an effective plasticizer for unmodified melamine-formaldehyde or urea-formaldehyde resin. In many cases it is desirable to intercondense this triazine compound directly with the melamine and formaldehyde, or with urea and formaldehyde as shown in subsequent examples.

When an equivalent amount of glyoxal is used instead of formaldehyde in this example, thermosetting compositions are obtained.

EXAMPLE IV

Sixty (60) parts of

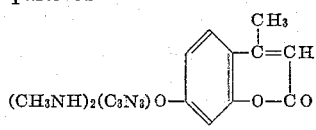

forty (40) parts of urea, 165 parts of aqueous $CH_2O$ (37.5% $CH_2O$), 2.5 parts aqueous $NH_3$ (28% $NH_3$), and 0.2 part NaOH in 5.5 parts $H_2O$ are refluxed for 25 minutes to produce a clear syrup. On dehydration it cures slowly at 140° C. but on the addition of chloroacetamide, the cure is accelerated. The addition of 80 parts of alpha flock to the syrup produces a molding compound, which, after being dried at 70° C. has an excellent cure and good flow when molded at 135° C. for 4 minutes. The product has a glossy surface and is light-colored. When an equivalent amount of thiourea is substituted in the above formula, the type of cure, molding characteristics, and appearance of the molded product obtained is substantially the same as with that of urea.

EXAMPLE V

One hundred thirty-five (135) parts of

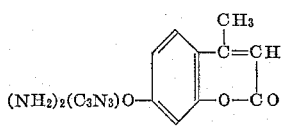

50.8 parts of para-toluene sulfonamide, 190 parts of aqueous $CH_2O$ (37.5% $CH_2O$), 0.2 parts NaOH in 5.5 parts of $H_2O$ are refluxed for one-half hour to produce a syrup which is clear while hot and cloudy on cooling, and has a slow cure. The addition of three parts of phthalic anhydride accelerates the cure.

EXAMPLE VI

One hundred thirty (130) parts of

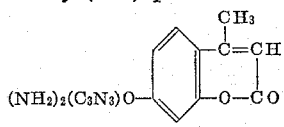

190 parts of aqueous $CH_2O$ (37.5% $CH_2O$), 29.0 parts of phenol, and 0.3 part of NaOH in 6 parts $H_2O$ are refluxed for 25–30 minutes to give a clear syrup when hot. At 135° C. the syrup has a prolonged cure but when 2.5 parts of chloroacetamide are added to the composition, an excellent cure is obtained.

EXAMPLE VII

One hundred fifteen (115) parts of

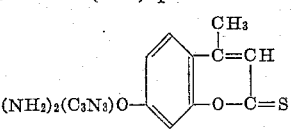

50 parts of melamine, 210 parts of aqueous $CH_2O$ (37.5% $CH_2O$), are refluxed for 15 minutes. The syrup is clear when hot, and when dehydrated cures alone at 135–140° C. A molding compound containing 100 parts of this syrup and 40 parts of alpha flock has excellent flow and cure.

EXAMPLE VIII

One hundred forty (140) parts of

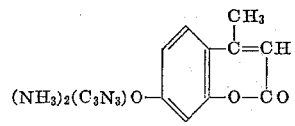

550 parts of dimethylol urea, 5 parts of $NH_3$ (in 2.5 parts of $H_2O$), 1000 parts of $H_2O$ (distilled), and 0.35 part NaOH (in 10 parts $H_2O$) are mixed and refluxed for 15 minutes. The syrup does not cure well alone at 135° C., but the addition of 3 parts of chloroacetamide accelerates the cure. Similar results are obtained when the triazine of this example is substituted for an equal amount of

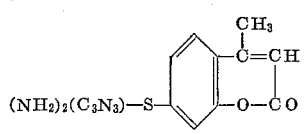

EXAMPLE IX

One hundred thirty (130) parts of

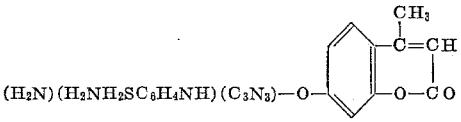

210 parts of aqueous $CH_2O$ (37.5% $CH_2O$), 2.0 parts of $NH_3$ in 5 parts $H_2O$, and 130 parts of aqueous trimethylol melamine (50% solu.) are refluxed for 20–30 minutes, and a syrup is obtained which cures slowly alone. The cure is accelerated by ammonium chloride to produce hard resins and molding compounds.

EXAMPLE X

One hundred thirty (130) parts of

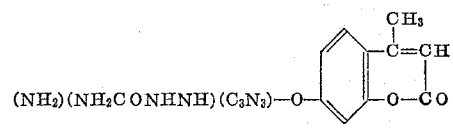

150 parts of aqueous $CH_2O$ (37.5% $CH_2O$), and 10 parts of glycerine are refluxed for 25–30 minutes to produce a clear resin curing at 135–140° C., which cure is accelerated by the addition of curing agents.

EXAMPLE XI

One hundred twenty-five (125) parts of

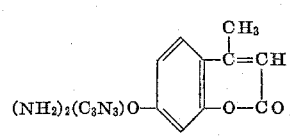

150 parts of aqueous $CH_2O$ (37.5% $CH_2O$), and 100 parts of butyl alcohol are mixed and refluxed for one-half hour to produce a clear syrup which cures slowly at 135° C. After reflux, the water is removed from the reaction product by azeotroping the mixture and returning the butyl alcohol to the reaction. The butylated resin is reacted with heat-convertible alkyd resins for coatings and enamels of excellent color retention and durability.

EXAMPLE XII

One hundred twenty-five (125) parts of $$(HOC_6H_4NH)_2C_3N_3O-\underset{\underset{O-CO}{|}}{\overset{\overset{CH_3}{|}}{\underset{}{C=CH}}}$$

150 parts of aqueous CH$_2$O (37.5% CH$_2$O), 20 parts diethyl malonate, and 2.5 parts NaOH in 20 parts H$_2$O are refluxed for 20 minutes to produce a condensation product which cures at 140–160° C.

EXAMPLE XIII

One hundred twenty (120) parts of $$\left[(NH_2)_2(C_3N_3)NHCH_2CH_2NHC_3N_3\right]\left[O-\underset{O-CO}{\overset{\overset{CH_3}{C=CH}}{}}\right]_2$$

140 parts of aqueous CH$_2$O (37.5% CH$_2$O), 1.0 part of NH$_3$ in 5 parts H$_2$O, and 15 parts acetamide are refluxed for 15 minutes to produce a clear syrup which cures alone at 135° C. With phthalic anhydride, chloroacetamide and ammonium chloride, the cure is excellent.

EXAMPLE XIV

Sixty-five (65) parts of $$(NH_2)_2(C_3N_3)O-\underset{O-CO}{\overset{\overset{CH_3}{C=CH}}{}}$$

38 parts of acrolein, and 0.2 part of NaOH in 5 parts H$_2$O are mixed and refluxed for 15 minutes to produce a syrup which cures at 140° C. to a hard tough resin by the addition of acids or acid-producing curing catalysts.

EXAMPLE XV

Fifty (50) parts of shellac and 15 parts of $$\underset{CO-O}{\overset{CH=C}{|}}-\underset{}{\overset{CH_3}{}}-O-C_6H_4NH(C_3N_3)(NHCH_2OH)_2$$

(the dimethylol derivative is prepared in accordance with the low temperature procedure of Example II) are mixed well and fused at 150° C. At this temperature, the mixture cures to a hard infusible resin. The addition of paraformaldehyde and hexamethylene tetraamine, respectively, accelerates the cure.

EXAMPLE XVI

Fifty (50) parts of alkyd resin (e.g. glyceryl phthalate) and 15 parts of $$\underset{CO-O}{\overset{CH=C}{|}}-\underset{}{\overset{CH_3}{}}-O-C_6H_4NH(C_3N_3)(NHCH_2OH)_2$$

are mixed together and heated on a hot plate at 150° C. This mixture cures to a hard, infusible product. The curing is accelerated by paraformaldehyde.

EXAMPLE XVII

Thirty-five (35) parts of 1-phenyl guanazole, 35 parts of aqueous formaldehyde (37.5% CH$_2$O), 2 parts of ammonia (28%), 0.75 part of NaOH (0.5 N), and 9 parts of the reaction product of Example II are heated together under reflux for 5 minutes at the end of which period separation of a resinous mass occurs. This resin is used satisfactorily for the production of molding compounds.

EXAMPLE XVIII

Twenty-five (25) parts of soya bean protein, 2.5 parts aqueous ammonia (28% NH$_3$), 3 parts aqueous NaOH (0.5 N), 150 parts aqueous CH$_2$O (37.5% CH$_2$O), and 80 parts of $$(NH_2)_2(C_3N_3)O-\underset{O-CO}{\overset{\overset{CH_3}{C=CH}}{}}$$

are heated together under reflux at the boiling point of the mixture for 20 minutes. The resulting syrup is mixed with 90 parts of alpha-cellulose and 0.2 part of zinc stearate to form a molding compound which is dried at 70° C. On molding, a well-cured molded piece having a well-knit and homogeneous structure is obtained.

EXAMPLE XIX

One hundred (100) parts of $$(NH_2)_2(C_3N_3)-O-\underset{O-CO}{\overset{\overset{CH_3}{C=CH}}{}}$$

and 100 parts of aldol are mixed together and then heated for 40 hours at 60° C. The resinous material thereby obtained melts on a hot plate at 140° C., and is converted to an insoluble, infusible state by the addition of ammonium chloride.

EXAMPLE XX

One hundred fifty (150) parts of $$(NH_2)(C_3N_3)(NHC_6H_4AsO_3H_2)\left[O-\underset{O-CO}{\overset{\overset{CH_3}{C=CH}}{}}\right]$$

150 parts of melamine, 260 parts of aqueous CH$_2$O (37.5% CH$_2$O), and 40 parts of NaOH in 100 parts H$_2$O are heated together under reflux at the boiling point of the mixture for 30–45 minutes yielding a viscous resinous dispersion which can be used directly as a tanning agent as shown in later examples, either as prepared or diluted to the desired concentration of solids. Also, it can be treated with sulfuric acid to liberate the resinous acid having a free arsenic group, which resin can be converted by heating to an insoluble, fusible product suitable as an ion exchange resin. Alternately, the sodium can be converted to other salts, such as the calcium, copper, antimony, nickel, etc., by the addition of an aqueous solution of such a salt, e.g., copper sulfate, cupric chloride, ferrous acetate, etc. These metallated resins, e.g., the copper resinate, can be used with cellulosic fillers, such as cotton, wood flour, alpha flock, to prepare molding compounds which are fungus- and mildew-resistant. They can also be used as coating and impregnants for wood as wood preservatives, especially the copper and arsenic salts.

The specific resin of this example, particularly in the form of polyethyleneimine salt, can also be used to impregnate paper and other fibrous sheet material and thereafter cured by heating to increase the wet strength of the paper. Paper impregnated with the resin in its acid form can be used for the separation and identification of organic bases using the standard paper-chromatography techniques. For these and other uses, this resin can be modified as shown in subsequent examples.

EXAMPLE XXI

One hundred forty (140) parts of $$NH_2(C_3N_3)\left[\overset{O}{\underset{||}{P}}-(OH)_2\right]O-\underset{O-CO}{\overset{\overset{CH_3}{C=CH}}{}}$$

120 parts of aqueous CH₂O (37.5% CH₂O), and 80 parts of NaOH in 200 parts H₂O are refluxed for 2 hours to produce a condensation product especially suitable as a tanning agent as such or as diluted to the desired concentration.

Instead of using the triazine derivatives of Examples XX and XXI alone, a mixture of such derivatives can be used to produce a wide variety of condensation products.

EXAMPLE XXII

Seventy (70) parts of

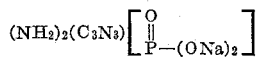

70 parts of

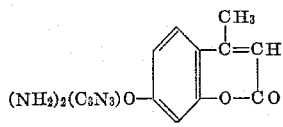

120 parts of aqueous CH₂O (37.5% CH₂O), and 70 parts water are mixed in a reaction flask equipped with a stirrer and reflux condenser. The mixture is heated to 90° C. for 1 hour and thereafter is cast into a shallow container and heated in an oven until the product is dry and hard. This product is then ground, washed with distilled water, and redried. The resulting acidic ion exchange resin absorbs about 89.91% of the calculated amount of NaOH from a 5% NaOH solution and then exchanges the sodium ion for calcium, magnesium, copper, silver ions, etc., upon treatment respectively with solutions containing such ions.

This condensation product can be modified by condensing the triazine derivative and the aldehyde with other aldehyde-reactable substances, including those that have ion exchange resin groups, e.g., urea, melamine, phenol, phenol-sulfonic acid, etc. An amphoteric ion exchange resin is readily prepared by using a triazine having a multiplicity of groups having ion exchange properties, e.g., a triazine having both an arsonic group and an amine group, e.g., (NH₂)(C₃N₃)(NHC₆H₄AsO₃)(NH-pyridyl)₂.

EXAMPLE XXIII

Fifty (50) pounds of pickled sheepskins are placed in a drum with 100 pounds of 5% salt solution and the drum is rotated. There is then added 39 pounds of the condensation product of Example XXII, three portions of 13 pounds each at one-half hour intervals, and the drumming continued for 6–8 hours. The skins are then allowed to lie in the liquor for 8–10 hours and then drummed for another one-half hour, after which the skins are drained, washed thoroughly, set out, crusted, and finished by the ordinary methods with excellent results. In a similar manner kidskins, calfskins, pigskins, snakeskins, deerskins, bearskins, alligatorskins, sharkskins, etc. are tanned.

The tanning agents of this invention can also be used as a supplementary tannage, for example, for skins that have been given a preliminary chrome or alum tannage, or they can be used in conjunction with other natural or synthetic tannages, as for example:

(A) Fifty pounds of chrome tanned kidskins at the end of tannage and before being dried out are added to 50 pounds of water in a rotating drum together with 8 pounds of the condensation product of Example XXII. The drumming is continued for 2 hours after which the skins are washed thoroughly, fat-liquored, set out, crusted, and finished by the ordinary finishing methods with excellent results.

(B) Fifty pounds of alum tanned calfskins are given a supplementary, excellent tanning using 10 pounds of the condensation product of Example XXII using the procedure used for tanned kidskins.

Instead of the condensation product of Examples XX, XXII and XXIV, respectively, are also used in the above procedures to produce light colored tanned leather which shows high shrink temperatures.

Instead of using the condensation products alone, the products of this invention can be used with other natural and synthetic tanning agents, e.g., by using mixtures of liquid quebracho extract with the condensation products of this example. For example, 100 pounds of pickled pigskins are treated with 40 pounds of a mixture of equal parts of liquid quebracho extract and the condensation product of Example XXII in 300 pounds of a 5% salt solution in a rotating drum. Ten pounds of the tanning mixture are added in four equal feeds at intervals of about one-half hour and the drumming continued for an additional 4–5 hours, after which the skins are allowed to remain in the liquor for 1–2 hours, then drummed for an additional hour. At the end of the drumming period, the hides are washed thoroughly, fat-liquored, set out, crusted, and finished in the ordinary method with excellent results.

Instead of the quebracho extract used above, synthetic tanning agents can be used such as the reaction products of aromatic sulfonic acids and aldehydes, for example, phenol-sulfonic acid and formaldehyde. A typical preparation is as follows: to 94 parts of phenol are added slowly 150 parts of 66° Baumé sulfuric acid at room temperature, and upon completion of the addition of the acid, the temperature is raised slowly to 90–100° C. and reacted for 2 hours, after which 70 parts of water and 60 parts of 38% formaldehyde are added and the temperature maintained at 75–85° C. for one hour. The solution is then cooled, the excess sulfuric acid neutralized with sodium hydroxide, and then diluted with water to a 45–47% solids content for use in tanning mixtures containing the condensation products of this invention. Alternately, the aromatic sulfonic acid can be condensed with an aldehyde, for example, phenol sulfonic acid and formaldehyde, initially together with the triazine derivatives of this invention to produce tanning agents with improved color over corresponding aromatic aldehyde compositions in which the triazine derivatives have been omitted, e.g.:

Ninety-four (94) parts of phenol are heated to 35° C., 150 parts of 66° Baumé sulfuric acid are added slowly and the temperature raised to 90–100° C. and maintained at this temperature for 2 hours. Seventy (70) parts of water are then added together with 15 parts of

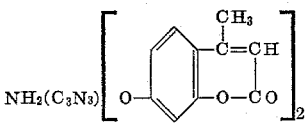

and 65 parts of 38% formaldehyde solution and the reaction continued for 2 hours. The solution is then cooled, the excess mineral acid neutralized with sodium hydroxide and the resulting solution diluted to the desired strength. This solution is used directly as a tanning agent as shown hereinabove.

EXAMPLE XXIV

One hundred twenty (120) parts of 190 parts of aqueous CH₂O (37.5% CH₂O) and 30 parts of phenol are mixed, and added thereto a sufficient 20% NaOH solution to adjust the pH to 8–8.5. The mixture is refluxed for 1–2 hours to produce the condensation product.

EXAMPLE XXV

Eighty (80) parts of

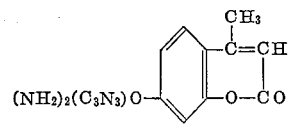

500 parts of dimethylol urea, 1 part of NH₃ (in 2.5 parts H₂O), 500 parts of H₂O distilled, 200 parts of ethyl alcohol, and 0.5 part of NaOH in 1 part H₂O are refluxed together until a noticeable viscosity increase is observed. Then 20 parts of thriethylene tetraamine are added and the mixture neutralized to a pH of 6. The mixture is cooled to room temperature and used with excellent results as a wet strength resin for papers of all kinds.

EXAMPLE XXVI

One hundred twenty (120) parts of

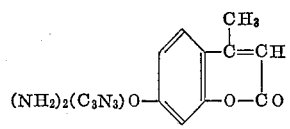

150 parts of aqueous CH₂O (37.5% CH₂O), and 20 parts of glycerine are mixed and refluxed for 30 minutes. The condensation product is used directly after dilution to the desired concentration as impregnants for cellulose products.

EXAMPLE XXVII

Sixty (60) parts of

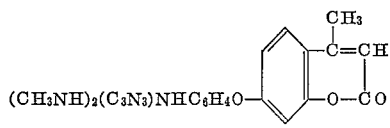

80 parts of aqueous CH₂O (37.5% CH₂O), and 5 parts of polyvinyl alcohol in 50 parts H₂O are refluxed for 30 minutes to produce a clear syrup which can be used as an impregnant for wool, silk, cotton, paper, wood, etc.

EXAMPLE XXVIII (a) Two hundred ten (210) parts of toluene sulfonamide-formaldehyde resin (Santolite MHP—Monsanto Chemical Company) which is an intermediate stage resin, are melted and heated to about 130° C., then 30 parts of

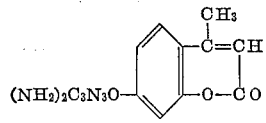

are added and held at that temperature until solution occurs. Then 13 parts of paraformaldehyde are added, the reaction continued for 2 hours at 160–170° C. and the fluorescent product cooled to room temperature. Melting point as determined by the ball and ring method is about 100° C., and the product is soluble in ketone and ester solvents, but insoluble in aliphatic hydrocarbon solvents.

(b) When in procedure (a) 25 parts of paraformaldehyde are used instead of 13 parts, a melting point of the product of about 104° C. is obtained.

(c) When 66 parts of the triazine are used in procedure (a) instead of 33 parts, an M.P. of about 121° C. is obtained.

(d) When 30 parts of the formaldehyde are used, an M.P. of about 145° C. is obtained respectively for the fluorescent condensation resins.

EXAMPLE XXIX

The procedure (a) of Example XXVIII is repeated, using 210 parts of toluene sulfonamide resin and 34 parts of

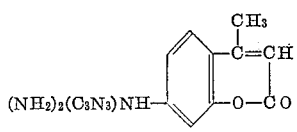

and 16 parts of paraformaldehyde. A fluorescent condensation product having an M.P. of about 100° C. is obtained.

EXAMPLE XXX

The procedure of Example XXVIII is repeated using 210 parts of toluene sulfonamide resins, 20 parts of

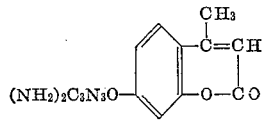

5 parts of melamine, and 14 parts of paraformaldehyde. A fluorescent resin insoluble in mineral spirits is obtained.

EXAMPLE XXXI

One hundred sixty (160) parts of a mixture of o- and p-toluene sulfonamides and 16 parts of

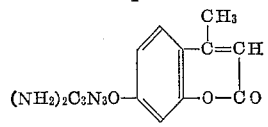

are heated to 120–125° C., and 45 parts of paraformaldehyde then added slowly during a period of 30 minutes. The temperature is then raised to 160° C. for 15 minutes and the mass thereafter cooled. The resin has a softening point of about 112° C.

EXAMPLE XXXII

To each of 100 parts of the resins of Examples XXVIII to XXXI inclusive is added, when molten at 160–170° C. during their preparation, the following parts of dyes, and the strongly fluorescent pigments of the colors indicated are obtained.

| Dye: | Color |
|---|---|
| (a) 1 part Malachite Green (Color index 657) | Green |
| (b) 3.3 parts of Brilliant Yellow 6G base | Lemon yellow |
| (c) 0.35 part of Rhodamine B Extra 1.2 parts of Brilliant Yellow 6G base | Fiery orange |
| (d) 1 part of Rhodamine B Extra (Color index 749), 1 part of Rhodamine 6G Extra | Blue-red |
| (e) 2.2 parts Brilliant Yellow 6G base, 0.23 part Rhodamine 6DN Extra (Color index 752) | Orange-yellow |

These resinous fluorescent pigments are insoluble in water and aliphatic hydrocarbons but are soluble in ketones and lower esters. When the resins of Examples XXVIII to XXXII inclusive, are ground, they rupture into concoidal fragments and process most satisfactorily on paint mills.

Depending on the particular characteristic of the resins alone, or with added dyes of all kinds, including fluorescent dyes or with or without pigments, the resins may be used in vehicles which are non-solvents to prepare inks and coatings, or they can be dissolved in solvent-type volatile vehicles to form coating compositions, or they can be used in intermediate form while still water-dispersible to form inks or other types of coating compositions.

EXAMPLE XXXIII

This example illustrates the preparation of silk-screen lacquers.

(a) There are mixed 224 parts of polyacrylic resin solution (Acryloid F–10), 150 parts of the pigments of XXXIIa (or b, c, d, or e), 3.6 parts of expanded silica gel (Santocel 54), 20.4 parts of mineral spirits and ground on a three-roll mill. The resulting silk-screen inks have brilliant shades and can be used most effectively in silk-screen printing and the like.

(b) Alternatively, a silk-screen fluorescent ink can be made by using alkyd resins by mixing the following ingredients: 19.8 parts of aluminum stearate gel.; 95.1 parts of long oil-(soya type) alkyd resin (56% solids); 0.6 part of metal naphthenate driers; 15 parts of mineral spirits; 101.3 parts of pigments of this example, and melting the mixture.

EXAMPLE XXXIV

A letter-press ink is made by using the polymers and pigments of this invention by mixing 57 parts of pigments of Example XXXa, 64.5 parts of quick-set varnish, 27.65 parts of high gloss varnish, and 1.8 parts of metal driers (cobalt naphthenate 3% solution) which are ground on a three-roll mill until a reading of 7NS is obtained on a Hegman Gauge. The resulting ink performs well in any conventional letter-press.

EXAMPLE XXXV

A clear, colorless fluorescent lacquer is prepared by mixing the following components: 15 parts of colorless fluorescent resin of Example XXVIIIa, 20 parts of low viscosity cellulose butyrate; 10 parts of dioctyl phthalate; 22 parts of methylethyl ketone; 22 parts of ethyl acetate; 10 parts of toluene, and stirring until the solution is homogeneous, followed by filtration. This brushable composition can be modified to be sprayable by dilution with 20–25 parts of a 50—50 mixture by weight of ethyl acetate and methylethyl ketone.

While certain features of this invention have been described in detail with respect to various embodiments thereof, it will, of course, be apparent that other modifications can be made within the spirit, and scope of this invention, and it is not intended to limit the invention to the exact details shown above, except insofar as they are defined in the following claims.

The invention claimed is:

1. A fluorescent composition of matter comprising the reaction product of an aldehyde and a triazine having the structure

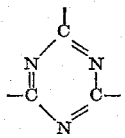

wherein at least one of said valencies is attached to an aldehyde-reactable group and at least one of said valencies is attached to a benzopyrone-substituent group having the formula

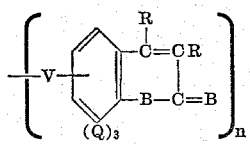

wherein $n$ is an integer having a value of at least one and no more than two;

V represents a radical selected from the class consisting of —O—, —S—, and

radicals;

Q represents a radical selected from the class consisting of —H, —R, —OR, —SR, —Cl, —Br, —F, and —NO$_2$ radicals;

R represents a hydrocarbon radical containing one to twelve carbon atoms.

B represents a radical of the class consisting of O and S.

2. A composition of claim 1 in which the triazine derivative is

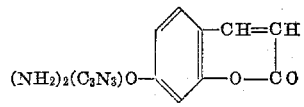

3. A composition of claim 1 in which the triazine derivative is

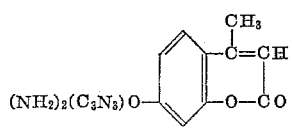

4. A composition of claim 1 in which the triazine derivative is

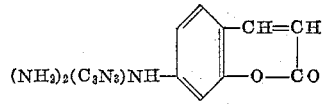

5. A composition of claim 1 in which the triazine derivative is

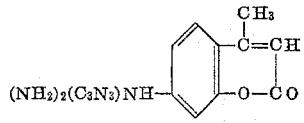

6. A composition of claim 1 in which the triazine derivative is

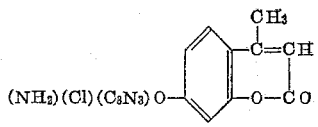

7. A composition of claim 1 in which said mass also comprises melamine.

8. A composition of claim 1 in which said mass also comprises a methylol melamine.

9. A composition of claim 1 in which said mass also comprises a methylol urea.

10. A composition of claim 1 in which said mass comprises a toluene sulfonamide aldehyde condensation product.

11. A composition of claim 1 in which said mass comprises a glyceryl phthalate resin.

12. A composition of claim 1 in which said aldehyde comprises formaldehyde.

13. A composition of claim 2 in which said aldehyde comprises formaldehyde.

14. A composition of claim 3 in which said aldehyde comprises formaldehyde.

15. A composition of claim 5 in which said aldehyde comprises formaldehyde.

16. A composition of claim 6 in which said aldehyde comprises formaldehyde.

17. A composition of claim 1 in which said mass also comprises a polyalkylene imine.

18. A heat-cured composition of claim 1.

(References on following page)

References Cited by the Examiner

UNITED STATES PATENTS

| | | | |
|---|---|---|---|
| 2,315,939 | 4/1943 | D'Alelio | 260—249.5 |
| 2,361,823 | 10/1944 | D'Alelio et al. | 260—249.6 |
| 2,482,252 | 9/1949 | Edgar | 260—849 |
| 2,809,954 | 10/1957 | Kazenas | 260—849 |
| 2,855,375 | 10/1958 | Dobay | 260—30.8 |
| 2,915,502 | 12/1959 | Albrecht | 260—67.6 |
| 2,938,873 | 5/1960 | Kazenas | 252—301.2 |
| 2,983,686 | 5/1961 | Konig et al. | 252—301.2 |
| 3,050,488 | 8/1962 | Graham | 260—30.8 |
| 3,053,796 | 9/1962 | D'Alelio | 260—868 |
| 3,082,190 | 3/1963 | Boldizar | 260—67.6 |
| 3,108,987 | 10/1963 | Galli et al. | 260—868 |

WILLIAM H. SHORT, *Primary Examiner.*

M. A. BRINDISI, *Examiner.*

R. D. EDMONDS, H. SCHAIN, *Assistant Examiners.*